US011961500B2

(12) United States Patent
Morton

(10) Patent No.: US 11,961,500 B2
(45) Date of Patent: Apr. 16, 2024

(54) MODULAR MOUNTING SYSTEM

(71) Applicant: AQUEDUCT, LLC, Seatac, WA (US)

(72) Inventor: Tyler Morton, Issaquah, WA (US)

(73) Assignee: AQUEDUCT, LLC, Seatac, WA (US)

( * ) Notice: Subject to any disclaimer, the term of this patent is extended or adjusted under 35 U.S.C. 154(b) by 0 days.

(21) Appl. No.: 18/081,794

(22) Filed: Dec. 15, 2022

(65) Prior Publication Data

US 2023/0282191 A1 Sep. 7, 2023

Related U.S. Application Data

(63) Continuation of application No. 17/323,300, filed on May 18, 2021, now Pat. No. 11,568,843.

(60) Provisional application No. 63/027,305, filed on May 19, 2020.

(51) Int. Cl.
*G10H 1/34* (2006.01)
*G10G 5/00* (2006.01)

(52) U.S. Cl.
CPC ............... *G10H 1/348* (2013.01); *G10G 5/00* (2013.01)

(58) Field of Classification Search
CPC ....................................................... G10H 1/348
See application file for complete search history.

(56) References Cited

U.S. PATENT DOCUMENTS 10,163,430 B2 * 12/2018 Jashyn ................... G10H 1/348
10,192,536 B1 * 1/2019 Jia .......................... G10H 1/348
10,380,984 B1 * 8/2019 Calder ................... G10H 1/348
10,621,964 B1 * 4/2020 Boxberger ........... G10H 1/0083
10,657,940 B1 * 5/2020 Calder ..................... G10H 1/32
10,706,828 B2 7/2020 Christian et al.
10,847,127 B2 * 11/2020 Stringham ............... G10G 5/00
11,568,843 B2 * 1/2023 Morton .................... G10H 1/32
2003/0066410 A1 * 4/2003 Stratton .................. G10H 1/32
84/422.1
2011/0247969 A1 10/2011 Pryde et al.
2016/0260422 A1 9/2016 Canivell Grifols et al.
2017/0206879 A1 7/2017 Fiden et al.
2017/0243572 A1 8/2017 Trifilio
2018/0301131 A1 10/2018 Jashyn
2020/0027433 A1 1/2020 Wilfer

OTHER PUBLICATIONS

International Search Report and Written Opinion for International Application No. PCT/US2021/032941 dated Sep. 10, 2021 (9 pages).

* cited by examiner

*Primary Examiner* — Robert W Horn
(74) *Attorney, Agent, or Firm* — Polsinelli PC

(57) ABSTRACT

A modular mounting system may include multiple parts couplable together to form a customizable assembly of parts. The parts may have a variety of lengths, depths, and heights and a rectangular prism shape or a rectangular wedge shape. A first part may have a first set of coupling holes on a first side surface for aligning with a second set of coupling holes on a second side surface of a second part. The first part may have a first cable routing opening for aligning with a second cable routing opening of the second part. The second part may couple to the first part at a front position and a third part may couple to the first part in a rear position and adjacent to the second part. Additional parts (e.g., a fourth part, a fifth part, etc.) may couple to the first part, the second part, and/or the third part.

20 Claims, 29 Drawing Sheets

MODULAR MOUNTING SYSTEM

CROSS-REFERENCE TO RELATED APPLICATION

The present application is a continuation of and claims the benefit of priority under 35 U.S.C. §§ 111 and 120 to U.S. Non-Provisional patent application Ser. No. 17/323,300 entitled "Modular Mounting System" and filed on May 18, 2021, which claims the benefit of priority under 35 U.S.C. § 119 to U.S. Provisional Patent Application No. 63/027,305, entitled "Modular Mounting System" and filed on May 19, 2020, which are incorporated by reference herein in their entireties.

BACKGROUND

Typical pedal boards are not customizable to allow use with many different numbers of pedals or different shaped and sized pedals at the same time. When most of the space on a typical pedal board is occupied and another pedal needs to be added, one may have to buy a larger pedal board and stop using their current one. Moreover, typical pedal boards do not allow the user to alter the slope in one or more multiple directions. Users often must provide their own additional hardware and customization process to manage the multitude of cables connecting devices mounted to the pedal boards and providing power. Pedal boards are typically designed to be rigid, which yields all of the stress experienced by the pedal board to the equipment mounted on the pedal board.

SUMMARY

Implementations described herein may include a modular system for mounting performance equipment, the modular system including: a first part with: a front surface; a rear surface; a first side surface including a first set of coupling holes for coupling the first part to one or more additional parts; a second side surface including a second set of coupling holes for coupling the first part to the one or more additional parts; a top surface; and a bottom plane; and a second part of the one or more additional parts with: a third side surface including a third set of coupling holes to align with the first set of coupling holes or the second set of coupling holes to couple the second part to the first part.

In some examples, the first set of coupling holes includes at least a front coupling hole arranged at a front position on the first side surface for coupling the one or more additional parts at the front position; and the first part has a fourth set of coupling holes including at least a rear coupling hole arranged at a rear position on the first side surface for coupling the one or more additional parts at the rear position. The first part may include a cable routing opening on the first side surface. The cable routing opening may be arranged between the front coupling hole and a middle coupling hole of the first set of coupling holes. The cable routing opening may be a first cable routing opening and the second part may include a second cable routing opening to align with the first cable routing opening. The first part may further comprise a first cable routing opening on the first side surface, a second cable routing opening on the second side surface, and a third cable routing opening on the rear surface. The first part may have a first depth dimension and the second part may have a second depth dimension that is half of the first depth dimension. The first part may be formed from a sheet of cut and bent metal. The top surface may be a first top surface and may be sloped relative to the bottom plane; and the second part may have a second top surface that is parallel to the bottom plane. The top surface may include one or more slots extending in a direction perpendicular to the first side surface. The first part may have a rectangular wedge shape or a rectangular prism shape and the second part may have the rectangular wedge shape or the rectangular prism shape.

In some examples, a modular system for mounting performance equipment may include: a first part with: a rectangular prism shape or a rectangular wedge shape; a first depth; and a first side surface including a first set of coupling holes to couple the first part to one or more additional parts; and a second part with: a second depth that is less than the first depth; and a second side surface including a second set of coupling holes to align with the first set of coupling holes to couple the second part to the first part.

In some examples, the first part may have the rectangular wedge shape and the second part may have the rectangular wedge shape. The second part may be couplable to the first part at a front position on the first side surface and the modular system may further comprise a third part couplable to the first part at a rear position on the first side surface. The second part may have a first height dimension and the third part has a second height dimension that is greater than the first height dimension. The first part may have a top surface for mounting performance equipment and an interior space for routing cables for the performance equipment.

In some examples, a modular system for mounting performance equipment may include: a first part with: a rectangular prism shape or a rectangular wedge shape; a first side surface including a first set of coupling holes for coupling the first part to one or more additional parts; and a first cable routing opening on the first side surface arranged between a first coupling hole of the first set of coupling holes and a second coupling hole of the first set of coupling holes; and a second part with: the rectangular prism shape or the rectangular wedge shape; a second side surface including a second set of coupling holes to align with the first set of coupling holes to couple the second part to the first part; and a second cable routing opening on the second side surface for aligning with the first cable routing opening.

In some examples, the first side surface may include a third set of coupling holes and the modular system further comprises a third part with a third side surface including a fourth set of coupling holes to align with the third set of coupling holes and couple the third part to the first part adjacent to the second part. The second part may include a rear surface with a third cable routing opening and the third part may include a front surface with a fourth cable routing opening to align with the third cable routing opening. The second part may have the rectangular prism shape with a first height dimension and the third part may have the rectangular prism shape with a second height dimension that is greater than the first height dimension.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the disclosed subject matter. It should be understood, however, that the disclosed subject matter is not limited to the precise embodiments and features shown. The accompanying drawings, which are incorporated in and constitute a part of this specification, illustrate an implementation of apparatuses, systems, and methods consistent with the disclosed subject matter and, together with the description, serves to explain advantages and principles consistent with the disclosed subject matter, in which.

DETAILED DESCRIPTION

Implementations described and claimed herein address the foregoing problems by providing a modular mounting system (hereinafter the "system') that may comprise a modular assembly of components or parts that may be couplable together and decouplable, for instance, with an easy-to-use coupling mechanism. The modular mounting system may be formed from cut and bent sheet metal and may comprise a top surface on which one or more pieces of performance equipment (e.g., musical effects devices, foot-controlled electronics, guitar pedals, switches, loop pedals, keyboard or synthesizer foot controls, light effects switches, pyrotechnic switches, or combinations thereof) may be mounted. The modular capabilities may provide multiple benefits for mounting performance equipment (e.g., cable management), as well as for other types of equipment or electronics (e.g., gaming console equipment, public speaking equipment, remote control systems, etc.).

Figure 1:
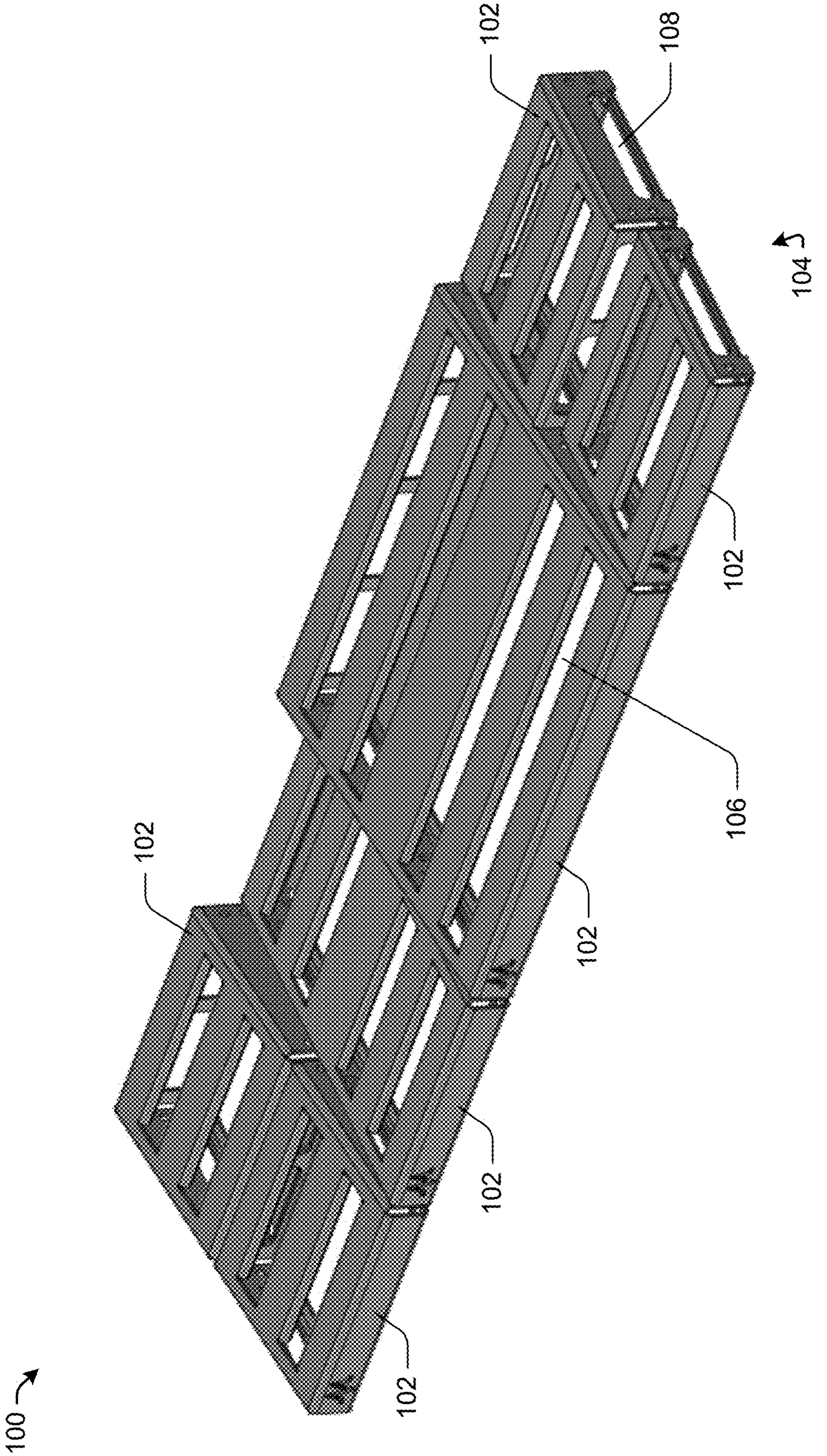
FIG. 1 illustrates an example modular mounting system.

FIG. 1 depicts an example system 100. In some examples, the system 100 may comprise multiple unique components or part(s) 102 (e.g., 18 different parts 102) which may form an assembly 104 of parts 102 that adapt to each other with a consistent mounting pattern. The length (x-direction), depth (y-direction), height/slope (z-direction) of the part(s) 102 may vary and be combined in the following ways to establish, in some examples, up to 18 parts 102:

- One, two, or three different lengths (e.g., 4, 8, and/or 16 inch lengths)
- One or two different depths (e.g., 6.5 and/or 13 inch)
- One, two, or three different heights (e.g., 0, 1.25 and/or 2.5 inch)
- One or two different slopes (e.g., 0 and 30 degree slopes)

In some examples, other combinations of the dimensions discussed above may result in the assembly 104 of any number less than 18 parts 102 (e.g., 2, 3, 4, 5, 6, 7, 8, 9, 10, 12, 16, etc.), the number of parts 102 being, in some instances, suited for a particular application. Additionally, the dimensions may have even more variations than as listed above (e.g., three different slopes, 5 lengths, etc.), and the assembly 104 of parts 102 may comprise more than 18 parts 102 (e.g., 24, 30, 36, etc.).

In some examples, a consistent mounting pattern may repeat twice within the y-direction, creating both "front" and "rear" positions of mounting capability. The consistent mounting pattern may allow both 'front' and 'rear' designated parts 102, of 6.5-inch depth (y-direction) to mount in either of the two locations. There may also be part(s) 102 with a 13-inch depth that contain both locations of mounting within the y-direction and are designated as the term 'long'. In some instances, the parts 102 may be able to mount side-by-side indefinitely, in the x-direction, and/or the parts 102 may mount together with standard quarter inch diameter hardware of the user's choice. Adapter plates may connect the front and rear mounting part(s) 102 in the absence of a 'long' part, which otherwise may function as the primary means of connection between 'front' and 'rear' part(s) 102.

In some examples, the part(s) 102 may comprise one or more slots 106 on a top surface, and/or one or more openings 108 on a left surface, right surface, and/or rear surface of the part(s) 102 to, in some instances, provide cable routing management, edges for mounting, and/or openings for air flow and heat management. In some examples, the slots 106 and/or openings 108 may comprise a triangle, a square, a rectangle, rounded corners, an oval, a circle, and/or combinations thereof. Accessory parts that interface with the cable routing slots may provide superior cable organization and minimize signal noise due to contacting (e.g., grounding) instruments or power cables. A substantially planar sliding tray may be couplable to an underside of the one or more part(s) 102 and may be slidable between multiple positions to provide access to the sliding tray and/or an interior content of the part(s) 102.

In some examples, the part(s) 102 may be manufactured with a single piece of 0.1-inch thick 5052-H32 Aluminum sheet metal. In some instances, the part(s) may be manufactured with various aluminum alloys, nickel alloys, stainless steel, and/or other metals to provide various strengths, weights, interior cable management space, stepping weight capacity, etc. In some instances, the part(s) 102 may be manufactured from a thinner sheet metal (e.g., 0.05 inches, 0.1 inches, etc.) or a thicker sheet metal (e.g., 0.2 inches, 0.3 inches, 0.4 inches, 0.5 inches, etc.) Each, or one or more, part(s) 102 may undergo a single laser cutting stage, various bending stages, and a single anodizing finish stage. In some examples, the part(s) 102 may include one or more surface finishes, generated via a surface finishing process, such as a paint, a gloss, matte, a texture (e.g., a roughness or grip, which may prevent slipping of equipment placed on the part(s) 102), a laser-etched design (e.g., of an equipment placement and/or mounting instructions or arrows or a logo), and/or combinations thereof.

In some examples, one or more part(s) 102 and/or the assembly 104 of part(s) 102 may be manufactured via a cutting and bending process that increases manufacturing efficiency, reducing shipping costs, reduces waste, and lets multiple part(s) 102 be manufactured via minor machine adjustments (e.g., changing one or two dimensions and/or edge contours) and/or a streamlined process involving a single material, sheet metal. The part(s) 102 may be cut and bent from sheet metal having a single thickness and/or a single piece of sheet metal.

In some examples, the part(s) 102 of the system 100 may be oriented and connected at any of the four sides of the part(s) 102, such that a user may orient and mount part(s) 102 in any configuration that they would like.

In some examples, the part(s) 102 may be designed with both specific shapes and sizes of musical effects devices in mind, as well as the combination of many different shapes and sizes. Moreover, manufacturing of the part 102 via a sheet metal cutting and bending process may provide additional flexibility for customizing any of the dimensions (e.g., of the part(s) 102, the slots 106, and/or the openings 108) to match a particular desired or predetermined value, for instance, to match a dimension (e.g., length or depth) of a pedal or equipment that is to be mounted to the part 102.

In some examples, the part(s) 102 may be engineered to flex under forces greater than 100 pounds to reduce the stress on the user's effects pedals that require depression of a foot-switch in order to toggle the device on/off.

In some examples, the system 100 may comprise a modular system in that any combination of part(s) 102 may be put together in any arrangement or configuration as desired by a user for their particular purpose.

In some examples, the part(s) 102 may comprise a mounting pattern comprising an interface (e.g., one or more mounting holes or connectors) on the left and right sides of the part(s) 102 which may allow adaptability between any and all part(s) 102 (e.g., the part(s) 102 may be couplable and decouplable to each other at any side of the part(s) 102). In some examples, the part(s) 102 may include an interlocking coupler at a surface or edge of the part(s) 102 for securing the parts 102 together and/or decoupling the parts 102 without additional hardware components. For instance, the interlocking coupler may comprise one or more interlocking grooves and/or alternating pins, which may be integrated and/or attached to the part(s) 102 (e.g., at a bottom edge of a side surface or a rear surface of the part(s) 102).

In some examples, an interior portion of the part(s) 102, slots 106, and/or openings 108 may provide space and/or passageways for cable management, organizing cables, power connectors, and instrument/patch cables. For instance, a passageway underneath the pedals may connect to the openings 108, which may further increase modularity and/or minimize audio signal noise. Moreover, one or more slots 106 of the part(s) 102 may provide improved air flow for heat management and/or may reduce an amount of material (e.g., sheet metal) for manufacturing the part 102 (e.g., thereby decreasing a weight of the part 102 and, in some instances, a corresponding shipping cost of the part 102).

Figure 2:
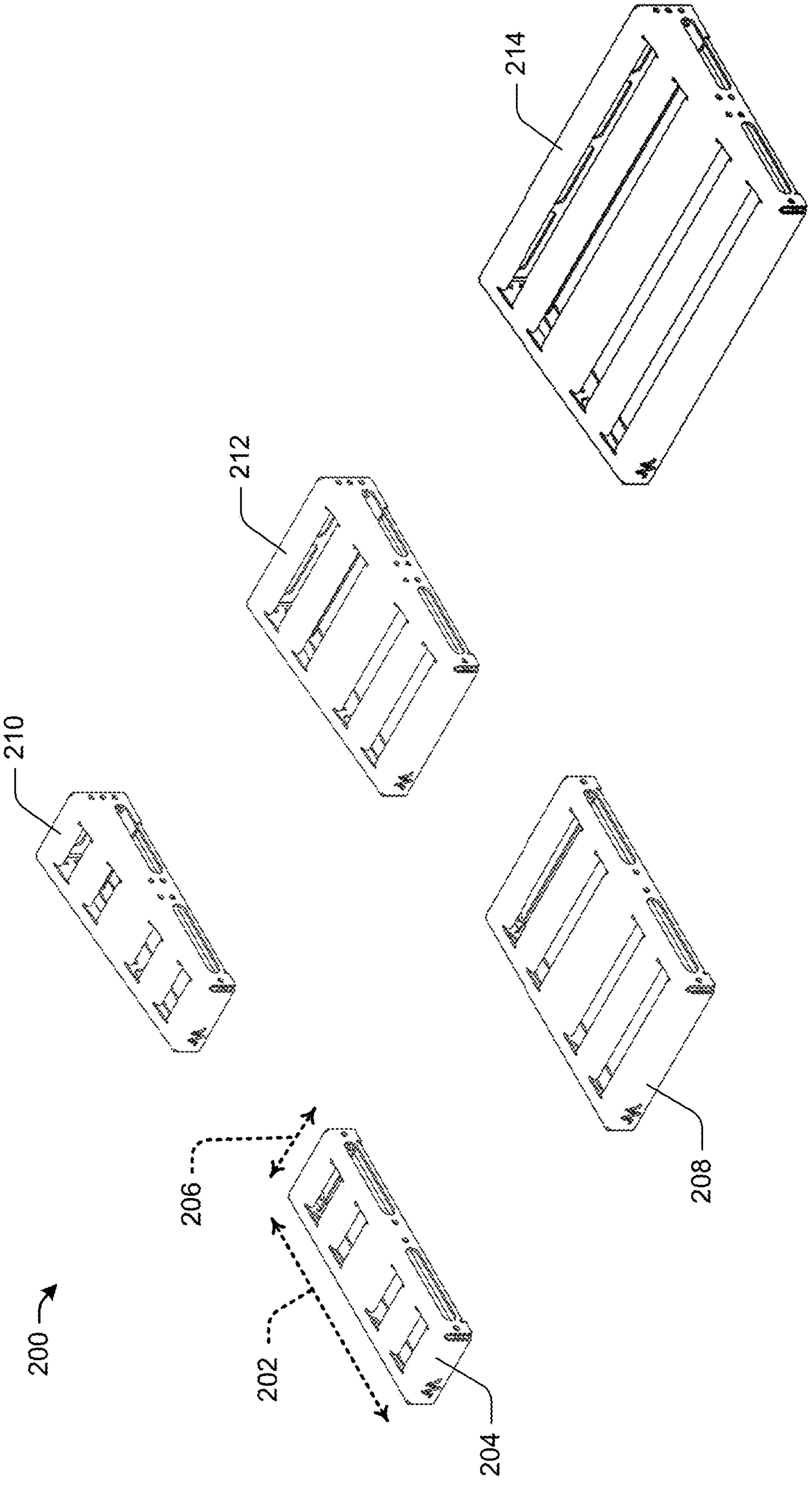
FIG. 2 illustrates example parts that may form at least a portion of the modular mounting system.

FIG. 2 depicts an example system 200 which may be similar to, identical to, and/or may form a portion of any of the systems discussed herein. FIG. 2 depicts multiple embodiments of example part(s) 102 that may comprise a "long" form factor with respect to the assembly 104. In other words, the part(s) 102 depicted in FIG. 2 may have a length dimension 202 (e.g., about 12 inches) that extends from substantially a front of the assembly 104 to substantially a back of the assembly 104.

In some examples, the system 200 may comprise a first long part 204. The first long part 204 may comprise a width dimension 206, for instance of about four inches. The first long part 204 may comprise a flat part in that a top surface may be substantially parallel with a bottom plane defined by the first long part 204 (e.g., the first part 102 may substantially form a rectangular prism having rounded corners and/or edges). The first long part may have a height dimension of about 1.3 inches. The system 200 may comprise a second long part 208, which may be substantially identical or similar to the first long part 204, for instance, by comprising the flat part with the top surface substantially parallel with the bottom plane having the same length dimension, and/or a same or similar slot 106 or opening 108 pattern. Additionally, the second long part 208 may include one changed dimension with respect to the first long part 204, such as a different width dimension (e.g., 8 inches, 16 inches, or any other width value, which may be configured to match the equipment to be mounted on the part 102 or a storage limitation). As such, the second long part 208 may look similar to the first long part 204 but for the one changed dimension.

In some examples, the system 200 may comprise a third long part 210. The third long part 210 may be substantially identical to the first long part 204 in many regards but may comprise a slanted part rather than a flat part, in that a top surface of the third long part 210 may be non-parallel (e.g., slanted) with respect to a bottom plane defined by the third long part 210. As such, in some instances, the third long part 210 may substantially comprise a wedge shape. The third long part 210 may comprise a front height dimension of about 1.3 inches and a rear height dimension of about 2.7 inches. The system 200 may comprise a fourth long part 212, which may be substantially identical or similar to the third long part 210, for instance, by comprising the slanted part with the top surface non-parallel with the bottom plane, by having the same length dimension, same height dimensions, and/or a same or similar slot 106 pattern or opening 108 pattern. Additionally, the fourth long part 212 may include one changed dimension with respect to the third long part 210, such as a different width dimension, such as 8 inches, or 16 inches, or any other width value. For instance, a fifth long 214 may be similar to the fourth long part 212 but with a width value of 16 inches instead of 8 inches. The fourth long part 212 and the fifth long part 214 may look similar to each other and/or the third long part 210 but for the one changed dimension.

Figure 3:
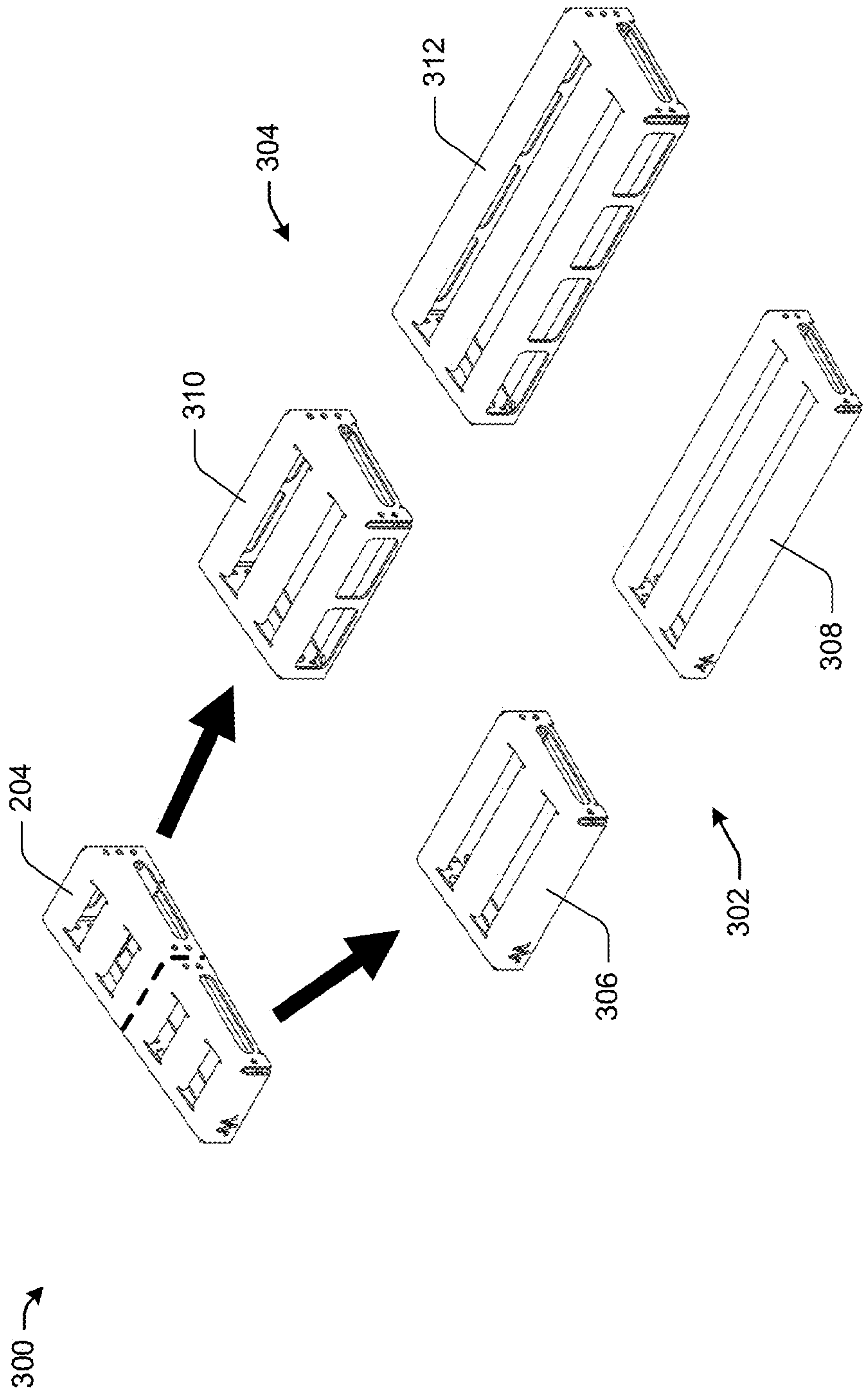
FIG. 3 illustrates example parts that may form at least a portion of the modular mounting system.

FIG. 3 depicts an example system 300 which may be similar to, identical to, and/or may form a portion of any of the systems discussed herein. The system 300 may include the first long part 204 and/or one or more other part(s) 102, such as one or more front part(s) 302 and/or one or more rear part(s) 304 (which, in some instances, may correspond to a long part such as the third long part 204). The front part(s) 302 may be substantially similar to a front portion of the corresponding long part (e.g., may comprise a substantially similar height as the corresponding long part) and/or may comprise a length dimension being substantially half, a third, or a quarter of the corresponding long part. For instance, the first long part 204 may have a length dimension of substantially 12 inches and the front part(s) 302 may have a length dimension of substantially six inches. The front part(s) 302 may comprise a first front part 306 (e.g., having an 8 inch width dimension), a second front part 308 (e.g., having a 16 inch width dimension), and/or any number of front part(s) 302 which may have different width dimensions. The front part(s) 302 may comprise a length dimension of about 5.6 inches. Front part(s) 302 that are also slanted parts may comprise a front height dimension of about 1.3 inches and/or a rear dimension of about 2 inches. Front part(s) 302 that are also flat parts may comprise a height dimension of about 1.3. In some instances, a front side of the front part(s) 302 may omit openings 108, and/or may include openings 108 on a back side.

In some examples, the rear part(s) 304 may be substantially similar to a rear portion of the corresponding long part (e.g., may comprise a substantially similar height as the corresponding long part) and/or may comprise a length dimension being substantially half, a third, or a quarter of the corresponding long part. For instance, the rear part(s) 304 may have a length dimension of about 5.6 inches. Rear part(s) 304 that are also slanted parts may comprise a front height dimension of about 2 inches and a rear height dimension of about 2.7 inches. Rear part(s) 304 that are also flat parts may comprise a height dimension of about 2 inches. The rear part(s) 304 may comprise a first rear part 310 (e.g., having an 8 inch width), a second rear part 312 (e.g., having a 16 inch width), and/or any number of rear part(s) 304 which may have different width values. In some instances, a front side of the rear part(s) 304 may include one or more openings 108 (e.g., one opening, two openings, three openings, four openings, etc.), and/or may include one more openings 108 on a back side (e.g., one opening, two openings, three openings, four openings, etc.). The front part(s) 302 (e.g., the first front part 306 and the second front part 308) and/or the rear part(s) 304 (e.g., the first rear part 310 and the second rear part 312) may comprise slanted parts, like those discussed above regarding FIG. 2.

Figure 4:
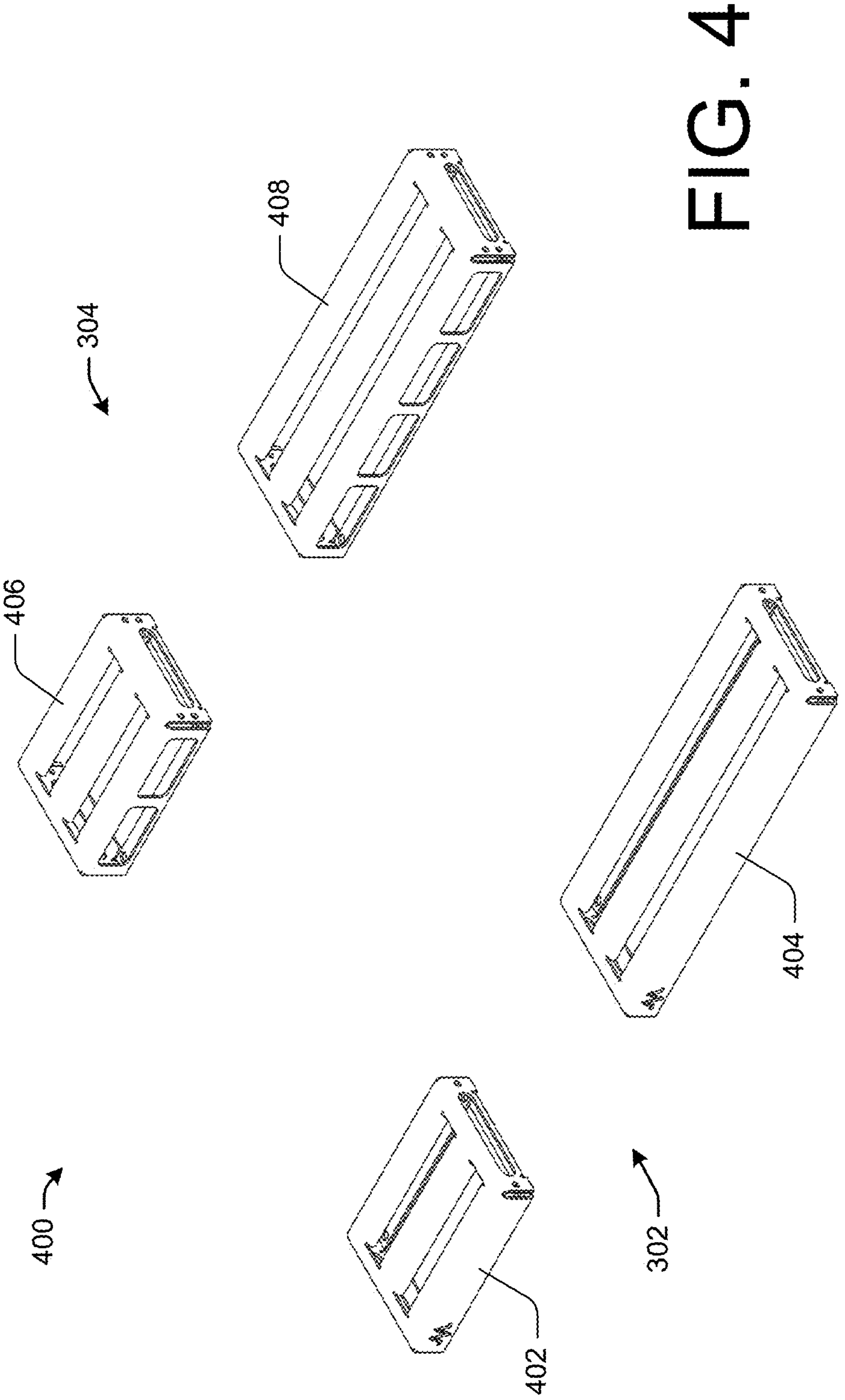
FIG. 4 illustrates example parts that may form at least a portion of the modular mounting system.

FIG. 4 depicts an example system 400 which may be similar to, identical to, and/or may form a portion of any of the systems discussed herein. The part(s) 102 depicted in FIG. 4 comprise flat parts in that the top surface of the part(s) 102 depicted are substantially parallel to a bottom plane defined by the part(s) 102. The system 400 may include a third front part 402 (e.g., having an 8 inch width dimension), a fourth front part 404 (e.g., having a 16 inch width dimension), a third rear part 406 (e.g., having an 8 inch width dimension), and/or a fourth rear part 408 (e.g. having a 16 inch width dimension). The front part(s) 302 (e.g., the third front part 402 and the second front part 404) and/or the rear part(s) 304 (e.g., the third rear part 406 and the fourth rear part 408) may comprise flat parts, like those discussed above regarding FIG. 2.

Figure 5A:
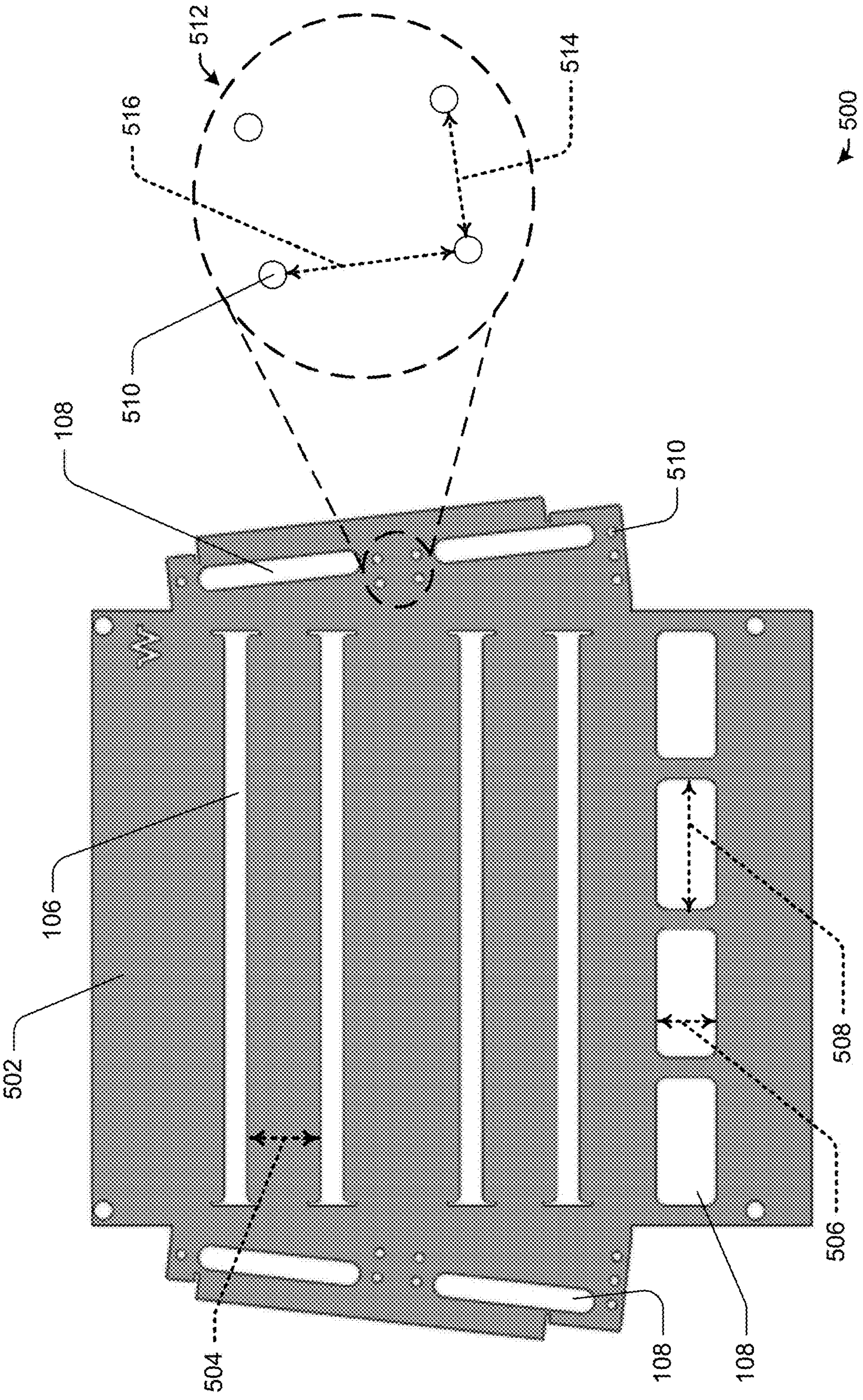
FIG. 5A illustrates an unfolded view of an example part that may form at least a portion of the modular mounting system.

FIG. 5A depicts an example system 500 which may be similar to, identical to, and/or may form a portion of any of the systems discussed herein. The system 500 may include an unfolded part 502, such as an unfolded long part that may comprise a slanted part and may have a width dimension of 16 inches. The unfolded part 502 may have an advantage over folded parts in that it may require less volume and corresponding shipping costs. In some instances, one or more part(s) 102 may include one or more slots 106 that may be spaced a distance 504 apart. The one or more slots 106 may extend in a direction perpendicular to a side surface of the part(s) 102. The part(s) 102 may comprise multiple uniform slots 106 positioned with substantially uniform distances 504 apart, and/or substantially parallel to each other. A length and/or a width of the slots 106 and/or the distance 504 between the slots 106 may contribute to improved air flow for heat management of equipment mounted to the part 102, and/or a flexibility of the part 102.

In some examples, the part(s) 102 may include one or more openings 108 that may be disposed on a front surface (e.g., for rear part(s) 304), a rear surface, a first (left) side, and/or a second (right) side. The openings 108 may have a height dimension 506 and/or a width dimension 508, which may contribute to cable management for cables that may attach to equipment mounted to the part(s) 102 and/or routed around, behind, and/or to a side and/or through an interior space or portion of the part(s) 102 and/or under a top surface of the part(s) 102. Multiple openings 108 may be uniformly distributed on a surface of the part(s) 102. In some examples, one or more openings 108 may be disposed at a rear surface of the part(s) 102 and may have a greater height dimension 506 than one or more openings at a side surface of the part(s) 102. One or more surfaces (e.g., front, rear, side) may include one, two, three, four, five, six, seven, eight, etc. openings 108, which may be arranged in a row.

In some examples, the part(s) 102 may include one or more mounting holes 510, which may form an arrangement 512 of mounting holes 510. In some examples, the arrangement may comprise two, three, four, five, six, etc. mounting holes 510, and the arrangement 512 may comprise a height dimension 514 and/or a depth dimension 516. One or more mounting holes 510 may be distributed individually and/or in rows or columns on any side surfaces, front surfaces, or rear surfaces of the part(s) 102.

Figure 5B:
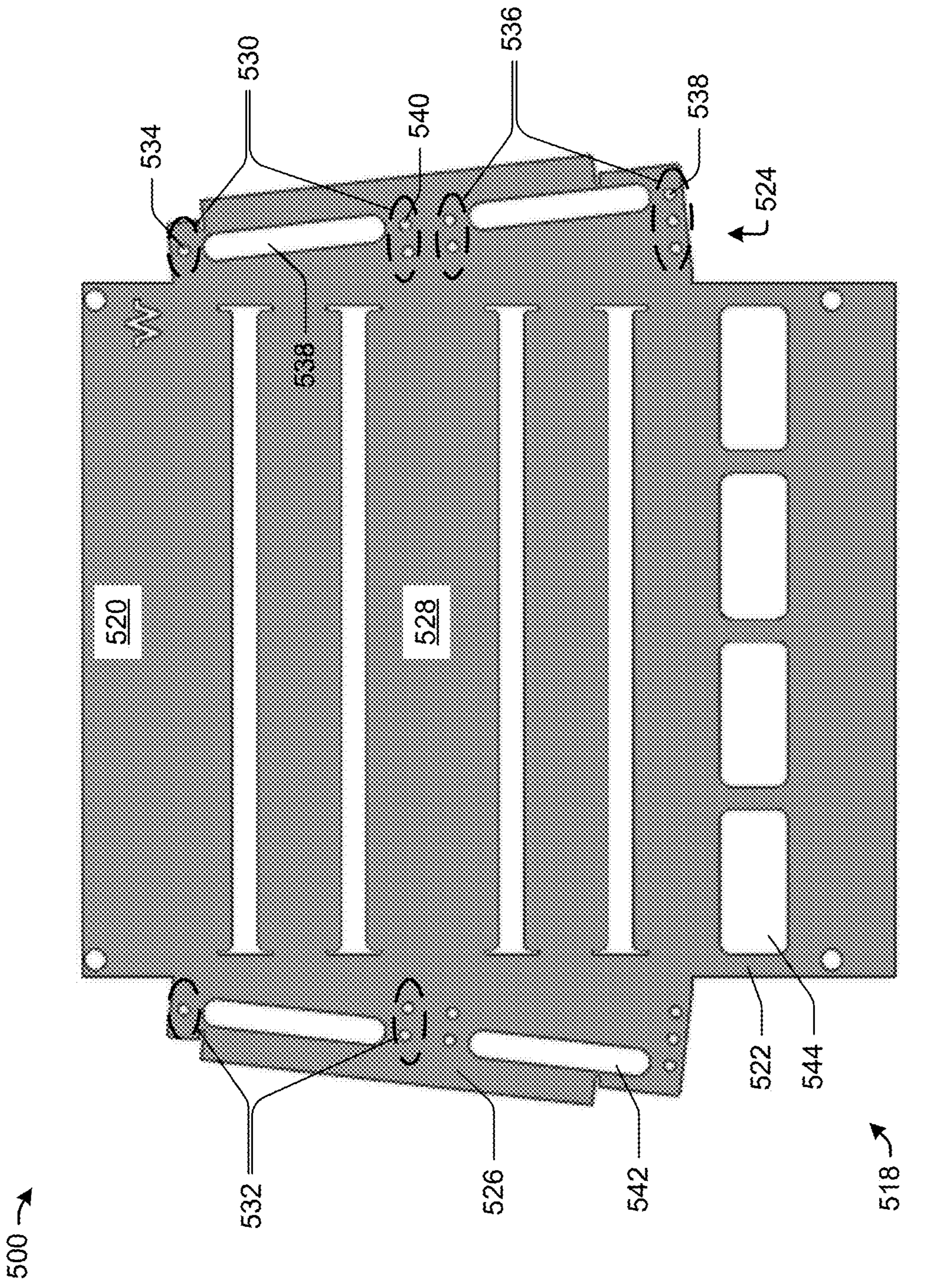
FIG. 5B illustrates an unfolded view of an example part that may form at least a portion of the modular mounting system.

FIG. 5B depicts an example system 500 which may be similar to, identical to, and/or may form a portion of any of the systems discussed herein. The system 500 may include a first part 518 (e.g., which may be any of the parts 102 discussed herein), which is presented in FIG. 5B as a slanted part in an unfolded position for ease of explanation. The first part 518 may have a front surface 520, a rear surface 522, a first side surface 524, a second side surface 526 a top surface 528, and when in the folded position, a bottom plane opposite the top surface 528 (as discussed in greater detail above regarding FIGS. 2 and 4). The first side surface 524 may include a first set of coupling holes 530 for coupling the first part 518 to one or more additional parts. The second side surface 526 may include a second set of coupling holes 532 for coupling the first part 518 to the one or more additional parts. A second part (e.g., any of the parts 102) may include a third side surface with a third set of coupling holes to align with the first set of coupling holes 530 and/or the second set of coupling holes 532 to couple the second part to the first part 518 (e.g., when the second part and the first part 518 are in the folded form). The second part may have a depth dimension (e.g., a dimension running along a side of the second part or from the front of the second part to the rear of the second part) that is half of a depth dimension of the first part 518.

In some examples, the first set of coupling holes 530 may include at least a front coupling hole 534 arranged at a front position on the first side surface 524. The first part 518 may include a fourth set of coupling holes 536 including a rear coupling hole 538 on the first side surface 524. The first set of coupling holes 530 may couple the second part at a front position and the second set of coupling holes 536 may couple the second part (and/or a third part) at a rear position. The first part 518 may include a cable routing opening 538 (e.g., opening 108) on the first side surface 524 (and/or the second side surface 526). The cable routing opening 538 may be arranged between the front coupling hole 534 and a middle coupling hole 540 of the first set of coupling holes 530. The second part may have a second cable routing opening (e.g., opening 108) to align with the first cable routing opening 538. In some examples, the first part 518 may include a second cable routing opening 542 on the second side surface 526 and a third cable routing opening 544 on the rear surface 522. In some examples, the first part 518 may have a rectangular wedge shape (e.g., like parts 210, 212, 214, 306, 308, 310, and/or 312 discussed above) or a rectangular prism shape (e.g., like parts 202, 204, 402, 404, 406, and/or 408 discussed above). The second part may have the rectangular wedge shape or the rectangular prism shape. The rectangular wedge shape may include four vertical sides (e.g., the front, the rear, the right side, and the left side) forming a rectangle from a top view, and a slanted top surface to form a wedge-shaped side view. The slanted surface may be non-parallel with a bottom plane or surface and a ground plane or surface and may extend with a gradient from the rear to the front. The rectangular prism shape may include the four vertical sides (e.g., the front, the rear, the right side, and the left side) forming the rectangle from the top view, and the top surface may be substantially horizontal. That is, the top surface may be substantially parallel to a bottom plane or surface and a ground plane or surface. Any of the surfaces of any of the parts 102 may be planar surfaces.

In some examples, the system 500 may include a third part with a third side surface including a fifth set of coupling holes to align with the third set of coupling holes 536 to couple the third part to the first part 518 in a rear position. The second part may be coupled to the first part 518 in the front position by coupling to the first set of coupling holes 530, such that the second part may be coupled to the first part 518 adjacent to the third part. The second part may have a rear surface (e.g., similar to rear surface 522 of the first part 518) with a fourth cable routing opening (e.g., similar to the third cable routing opening 544 of the first part 518), and the third part may have a front surface with a fifth cable routing opening (e.g., similar to parts 310 and 312 illustrated in FIG. 3) for aligning with the fourth cable routing opening on the rear surface of the second part.

In some instances, upon aligning the first set of coupling holes 530 of the first part 518 with the coupling holes of the second part, and attaching a coupling mechanism (e.g., a screw, a bolt, and/or other hardware inserted into the coupling holes), the first part 518 may form a detachable connection with the second part. For instance, the first part 518 may be configured so that the first side surface 524 (or any side surface) and/or first plane meets, abuts, and/or adjoins to a second side surface or second plane of the second part. The second part may have an interchangeable relationship with the first part 518 in that, after being coupled to the first part 518, the second part may be decoupled from the first part 518 and replaced, at a same location non the first part 518, with a third part. Any number of parts 102 may have interchangeable relationships with the first part 518 or any other of the parts 102 by forming detachable connections with the first part 518 or other parts 102 to form the assembly 104. As such, the assembly 104 may be a modular assembly formed of modular, interchangeable parts 102 forming detachable connections with each other.

FIGS. 6-23 further illustrate the ornamental appearance of part(s) 102 discussed above in more detail (i.e. with example contour shading).

Figure 6:
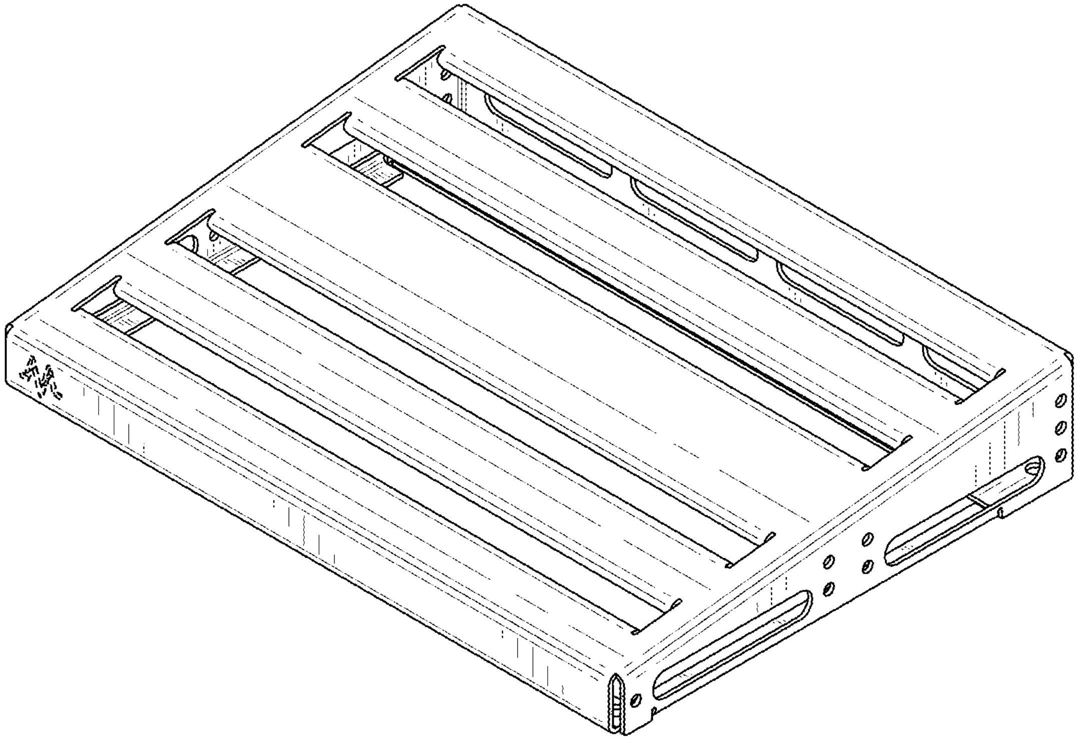
FIG. 6 illustrates a perspective view of an example part that may form at least a portion of the modular mounting system.

FIG. 6 is a front perspective view of a first embodiment of the part 102, such as a slanted, long part.

Figure 7:
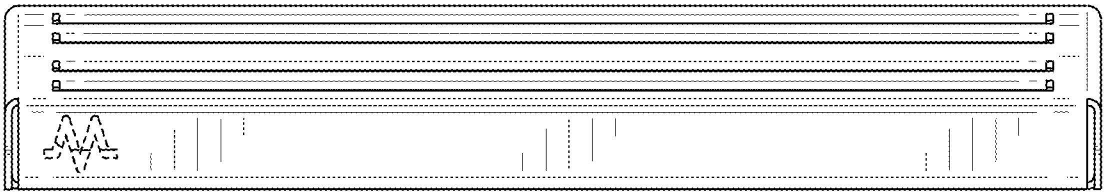
FIG. 7 illustrates a front view of an example part that may form at least a portion of the modular mounting system.

FIG. 7 is a front view of the part 102 depicted in FIG. 6.

Figure 8:
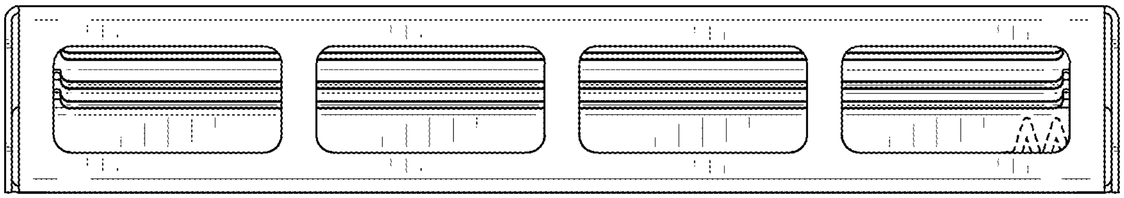
FIG. 8 illustrates a rear view of an example part that may form at least a portion of the modular mounting system.

FIG. 8 is a rear view of the part 102 depicted in FIG. 6.

Figure 9:
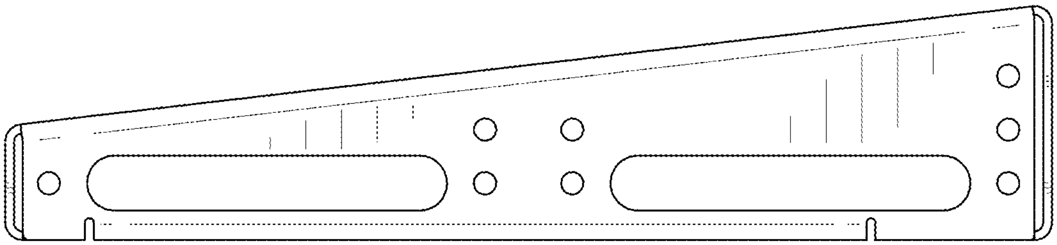
FIG. 9 illustrates a side view of an example part that may form at least a portion of the modular mounting system.

FIG. 9 is a right side view of the part 102 depicted in FIG. 6. A left side view may be substantially identical to (e.g., a mirror-image of) the right side view.

Figure 10:
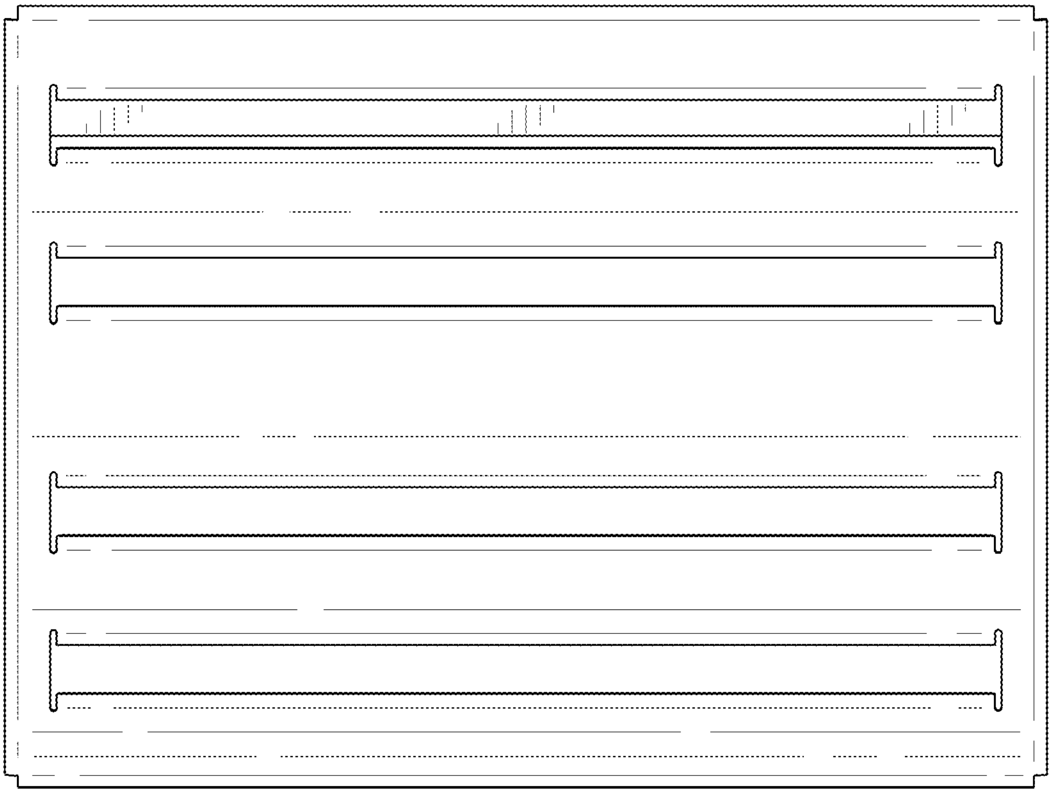
FIG. 10 illustrates a top view of an example part that may form at least a portion of the modular mounting system.

FIG. 10 is a top view of the part 102 depicted in FIG. 6.

Figure 11:
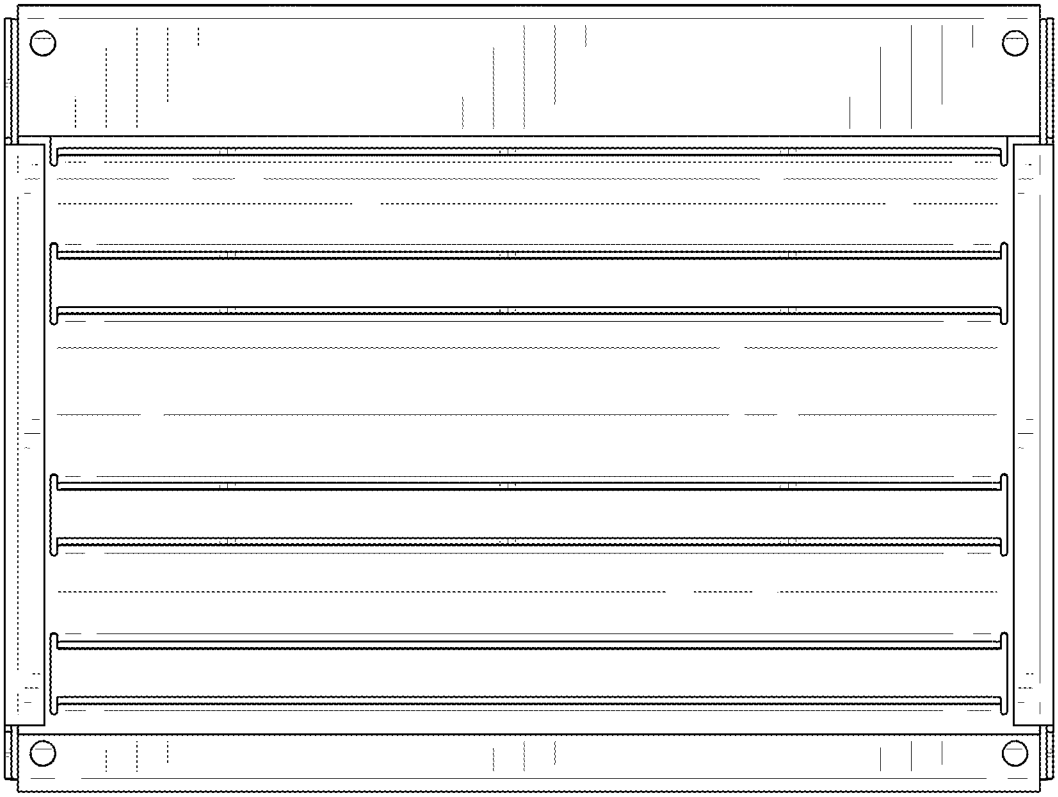
FIG. 11 illustrates a bottom view of an example part that may form at least a portion of the modular mounting system.

FIG. 11 is a bottom view of the part 102 depicted in FIG. 6.

Figure 12:
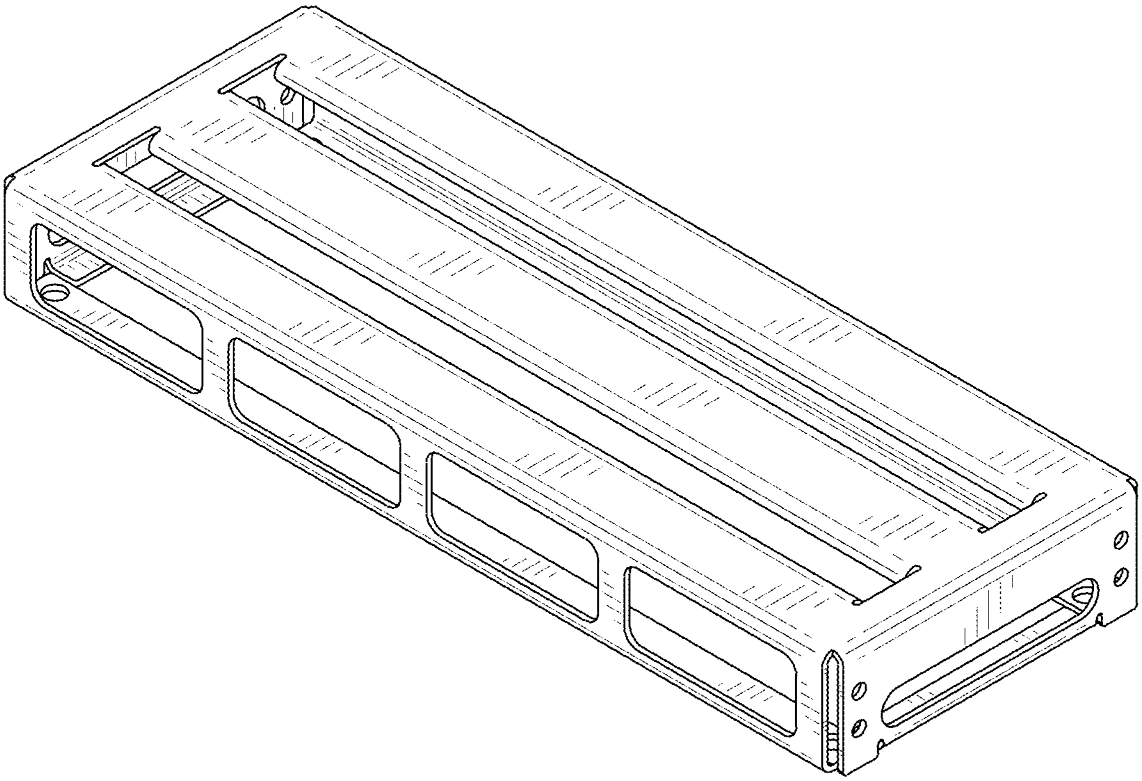
FIG. 12 illustrates a perspective view of an example part that may form at least a portion of the modular mounting system.

FIG. 12 is a front perspective view of a second embodiment of the part 102, such as a flat, rear part.

Figure 13:
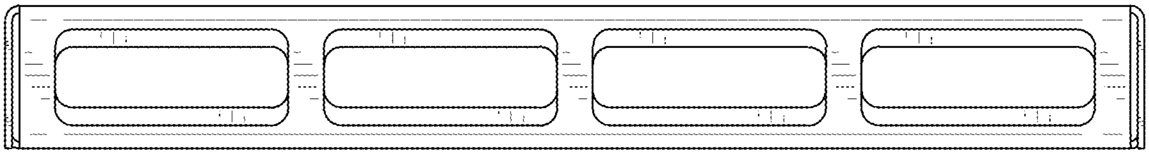
FIG. 13 illustrates a front view of an example part that may form at least a portion of the modular mounting system.

FIG. 13 is a front view of the part 102 depicted in FIG. 12.

Figure 14:
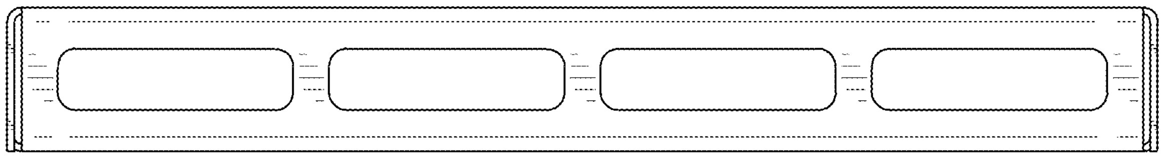
FIG. 14 illustrates a rear view of an example part that may form at least a portion of the modular mounting system.

FIG. 14 is a rear view of the part 102 depicted in FIG. 12.

Figure 15:
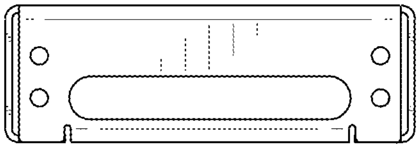
FIG. 15 illustrates a side view of an example part that may form at least a portion of the modular mounting system.

FIG. 15 is a right side view of the part 102 depicted in FIG. 12. A left side view may be substantially identical to (e.g., a mirror-image of) the right side view.

Figure 16:
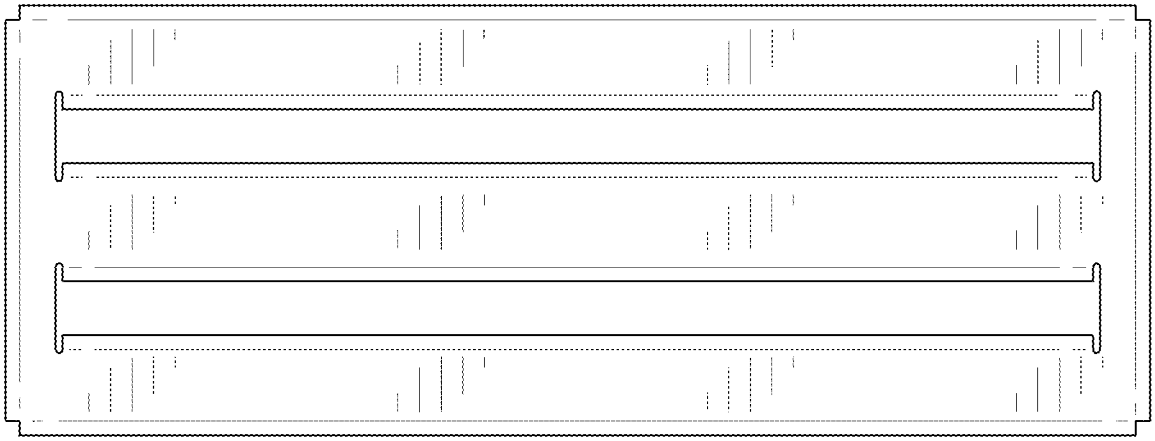
FIG. 16 illustrates a top view of an example part that may form at least a portion of the modular mounting system.

FIG. 16 is a top view of the part 102 depicted in FIG. 12.

Figure 17:
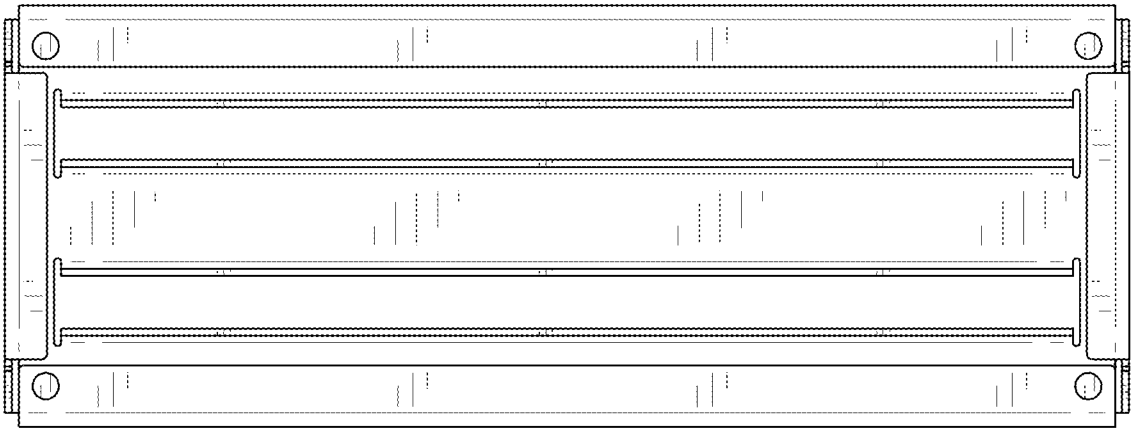
FIG. 17 illustrates a bottom view of an example part that may form at least a portion of the modular mounting system.

FIG. 17 is a bottom view of the part 102 depicted in FIG. 12.

Figure 18:
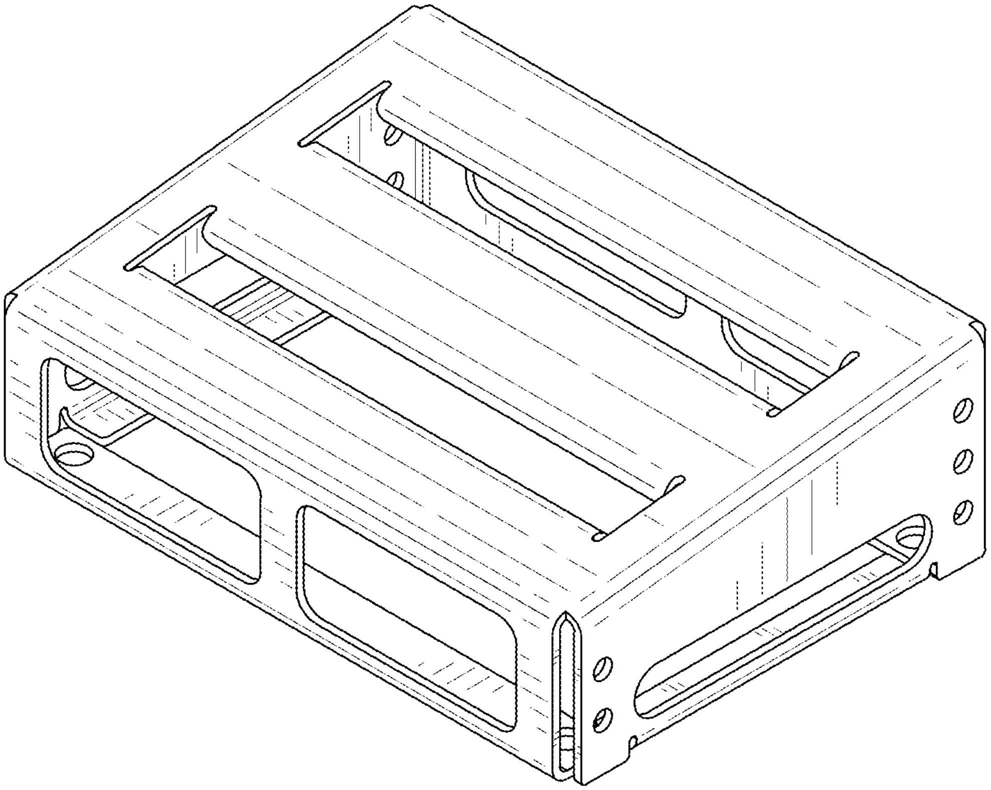
FIG. 18 illustrates a perspective view of an example part that may form at least a portion of the modular mounting system.

FIG. 18 is a front perspective view of a third embodiment of the part 102, such as a slanted, rear part.

Figure 19:
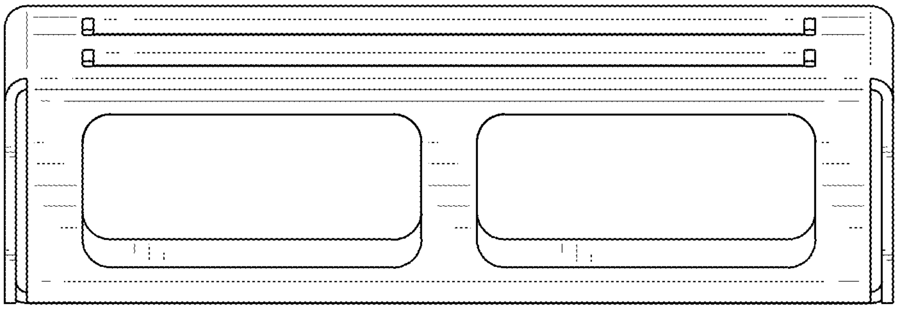
FIG. 19 illustrates a front view of an example part that may form at least a portion of the modular mounting system.

FIG. 19 is a front view of the part 102 depicted in FIG. 18.

Figure 20:
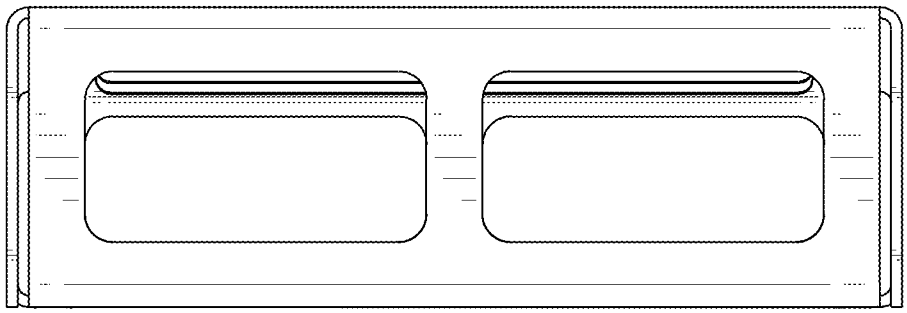
FIG. 20 illustrates a rear view of an example part that may form at least a portion of the modular mounting system.

FIG. 20 is a rear view of the part 102 depicted in FIG. 18.

Figure 21:
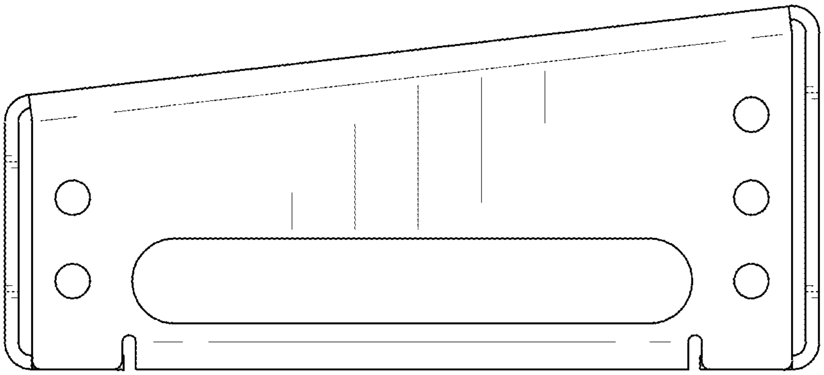
FIG. 21 illustrates a side view of an example part that may form at least a portion of the modular mounting system.

FIG. 21 is a right side view of the part 102 depicted in FIG. 18. A left side view may be substantially identical to (e.g., a mirror-image of) of the right side view.

Figure 22:
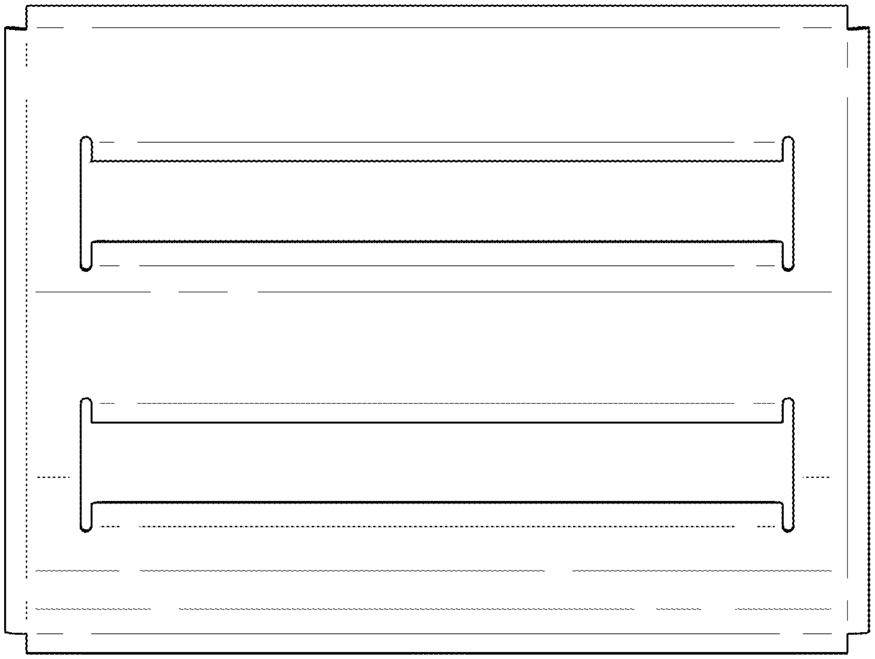
FIG. 22 illustrates a top view of an example part that may form at least a portion of the modular mounting system.

FIG. 22 is a top view of the part 102 depicted in FIG. 18.

Figure 23:
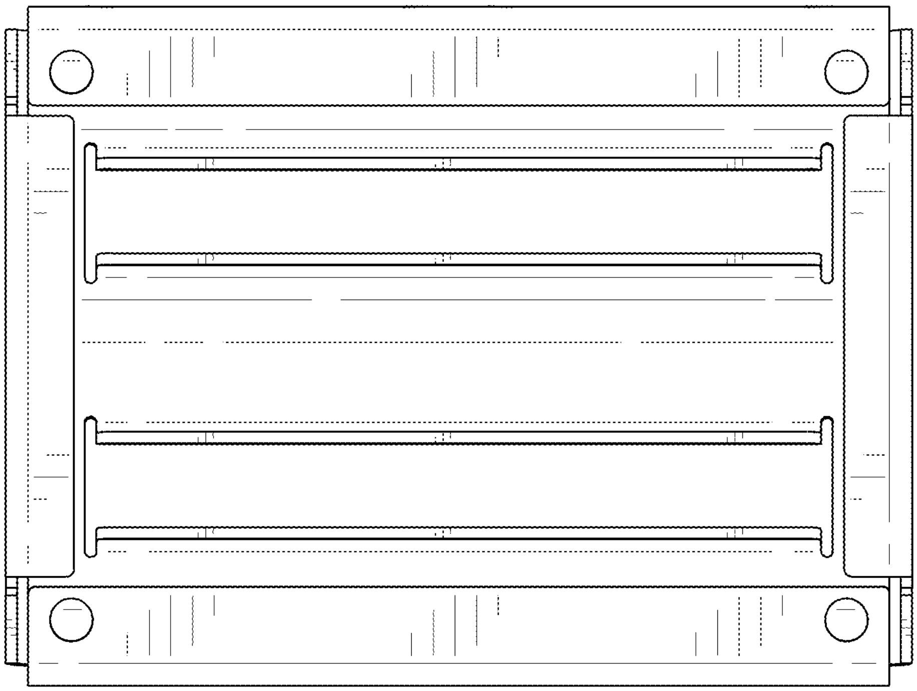
FIG. 23 illustrates a bottom view of an example part that may form at least a portion of the modular mounting system.

FIG. 23 is a bottom view of the part 102 depicted in FIG. 18.

Figure 24:
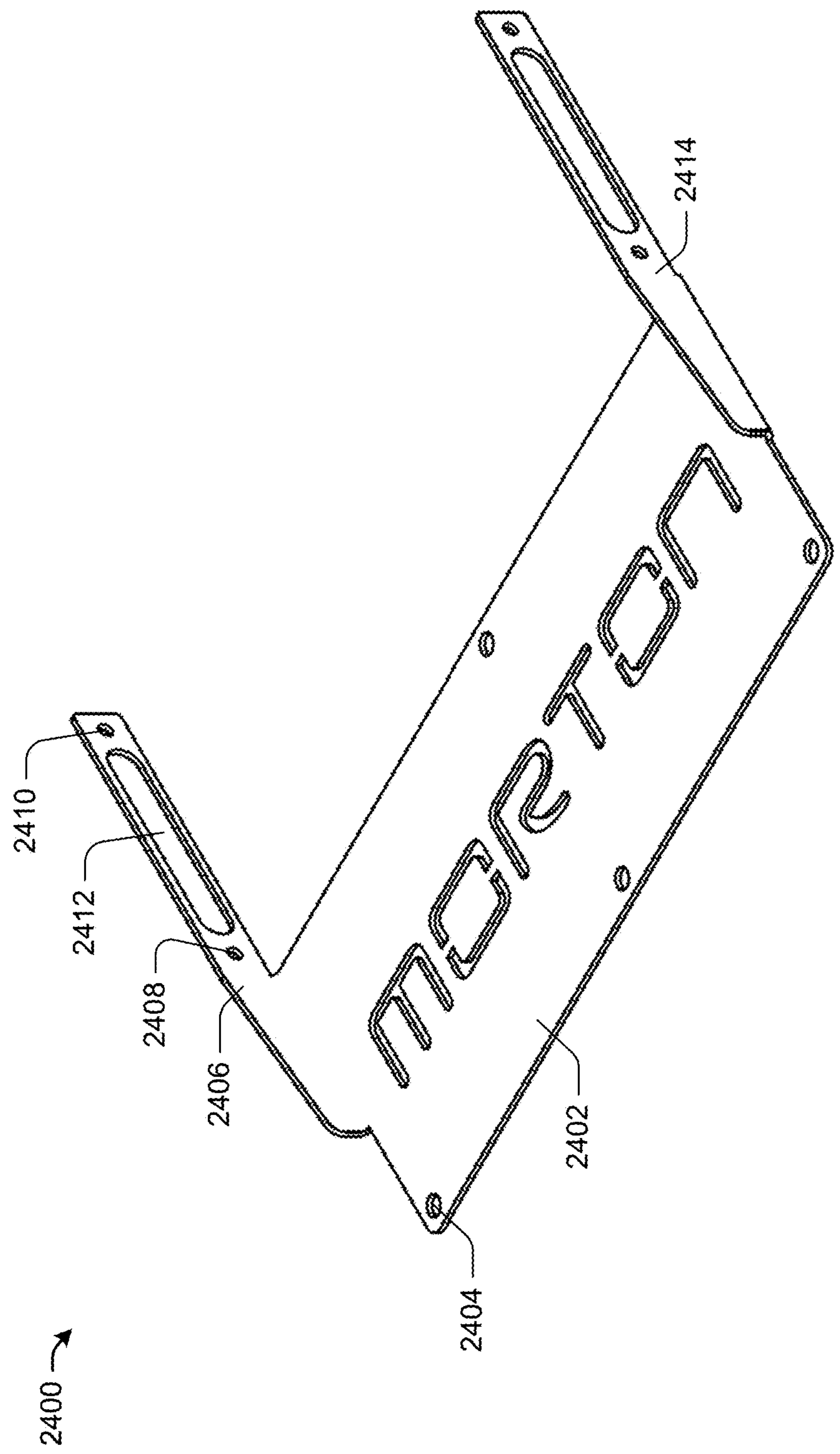
FIG. 24 illustrates a perspective view of an example part that may form at least a portion of the modular mounting system.

FIG. 24 is a perspective view of an example front tray 2400 which may be an embodiment of the part 102 and may form a portion of the assembly 104 or any of the systems discussed herein. The front tray 2400 may have a 16-inch length dimension and may include a substantially planar surface 2402 with one or more mounting holes 2404, for instance, to mount a "switcher" or "controller" pedal and/or other effects pedals at a front portion of the assembly 104 (e.g., a portion closest to a user). The front tray 2400 may include a set of coupling holes on a first mounting arm 2406 including a front coupling hole 2408 and a rear coupling hole 2410 with a cable routing opening 2412 disposed between the front coupling hole 2408 and the rear coupling hole 2410. A second mounting arm 2414 may be disposed at a side of the front tray 2400 opposite the first mounting arm 2406 and may include a similar or identical arrangement of features as the first mounting arm 2406, such as the cable routing opening 2412 between the front coupling hole 2408 and the rear coupling hole 2410. The first mounting arm 2406 and the second mounting arm 2414 may be planar and perpendicular relative to the substantially planar surface 2402, and may extend from the substantially planar surface 2402 along the sides of the front tray 2400. As such, the front tray 2400 may be couplable to the front portion(s) of one or more other part(s) 102 of the assembly 104.

The front tray 2400 may include one or more ornamental features such as a logo cut-out on the substantially planar surface 2402 or other surfaces of the front tray 2400.

Figure 25:
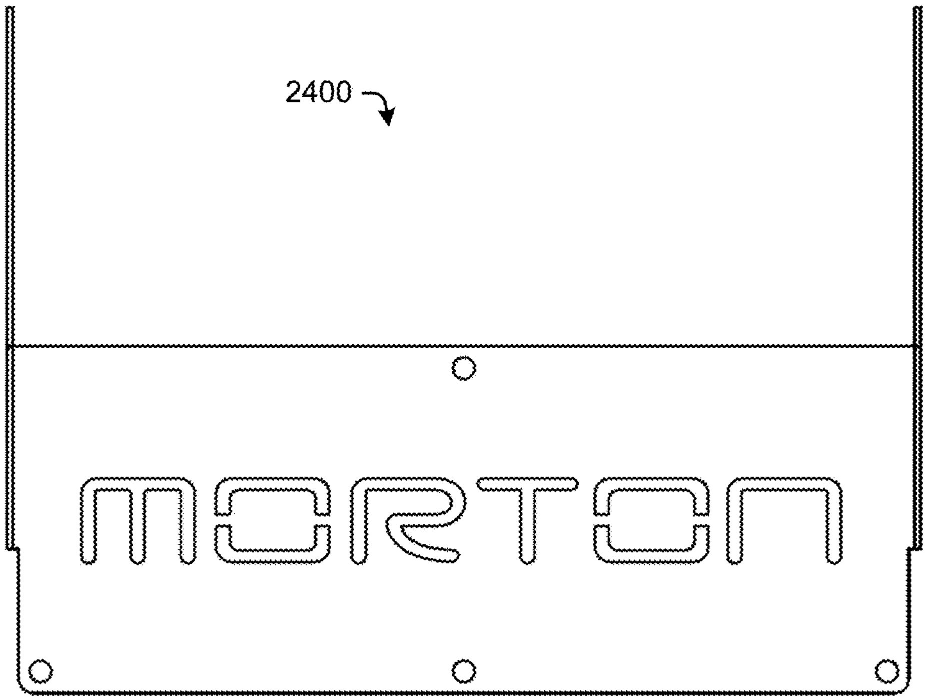
FIG. 25 illustrates a top view of an example part that may form at least a portion of the modular mounting system.

FIG. 25 illustrates a top view of the front tray 2400.

Figure 26:
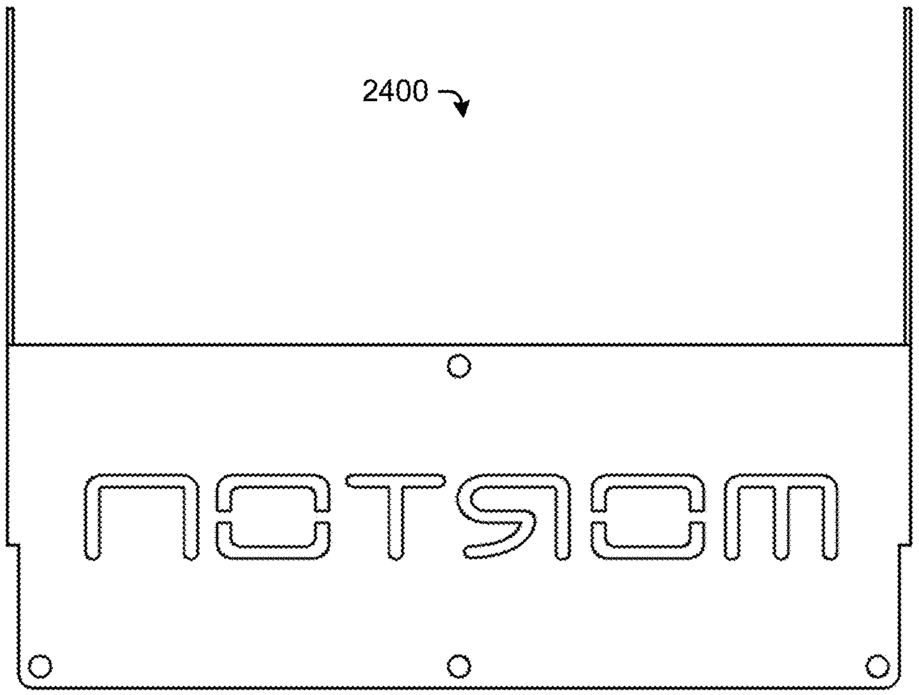
FIG. 26 illustrates a bottom view of an example part that may form at least a portion of the modular mounting system.

FIG. 26 illustrates a bottom view of the front tray 2400.

Figure 27:
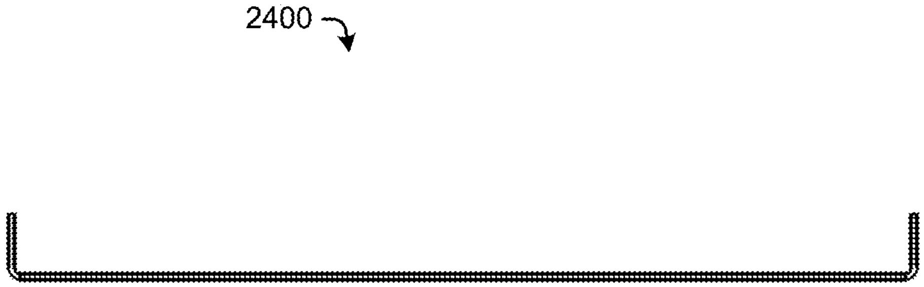
FIG. 27 illustrates a front view of an example part that may form at least a portion of the modular mounting system.

FIG. 27 illustrates a front view of the front tray 2400.

Figure 28:
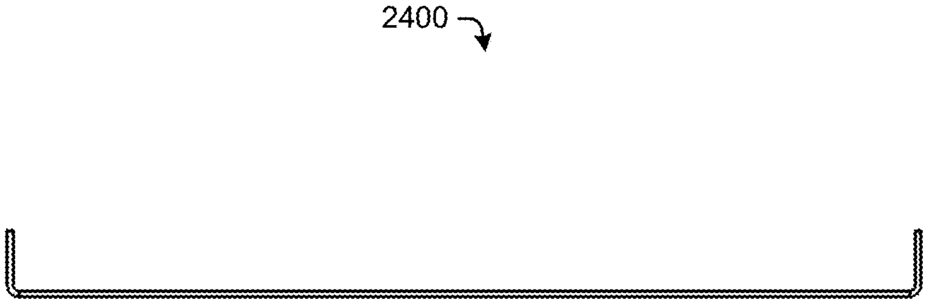
FIG. 28 illustrates a rear view of an example part that may form at least a portion of the modular mounting system.

FIG. 28 illustrates a rear view of the front tray 2400.

Figure 29:
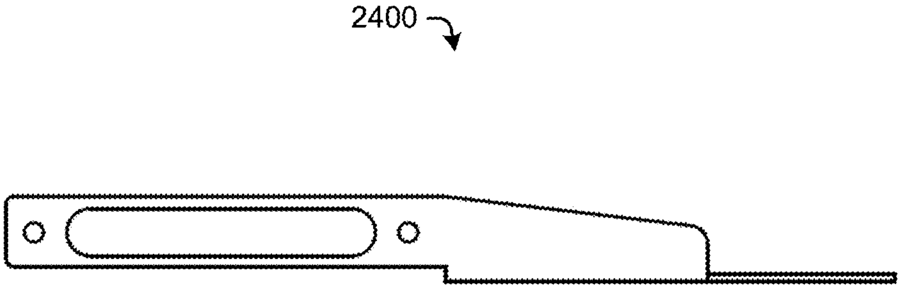
FIG. 29 illustrates a left side view of an example part that may form at least a portion of the modular mounting system.

FIG. 29 illustrates a left side view of the front tray 2400.

Figure 30:
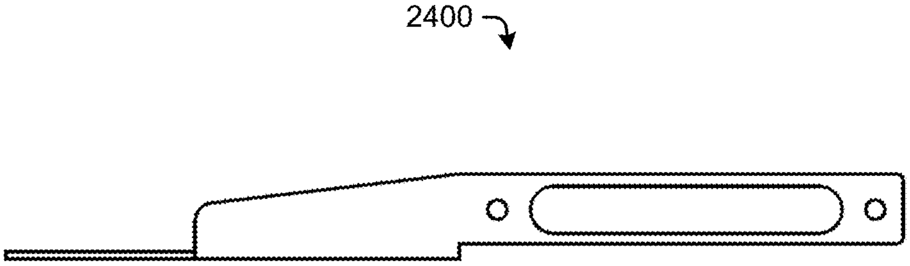
FIG. 30 illustrates a right side view of an example part that may form at least a portion of the modular mounting system.

FIG. 30 illustrates a right side view of the front tray 2400.

Figure 31:
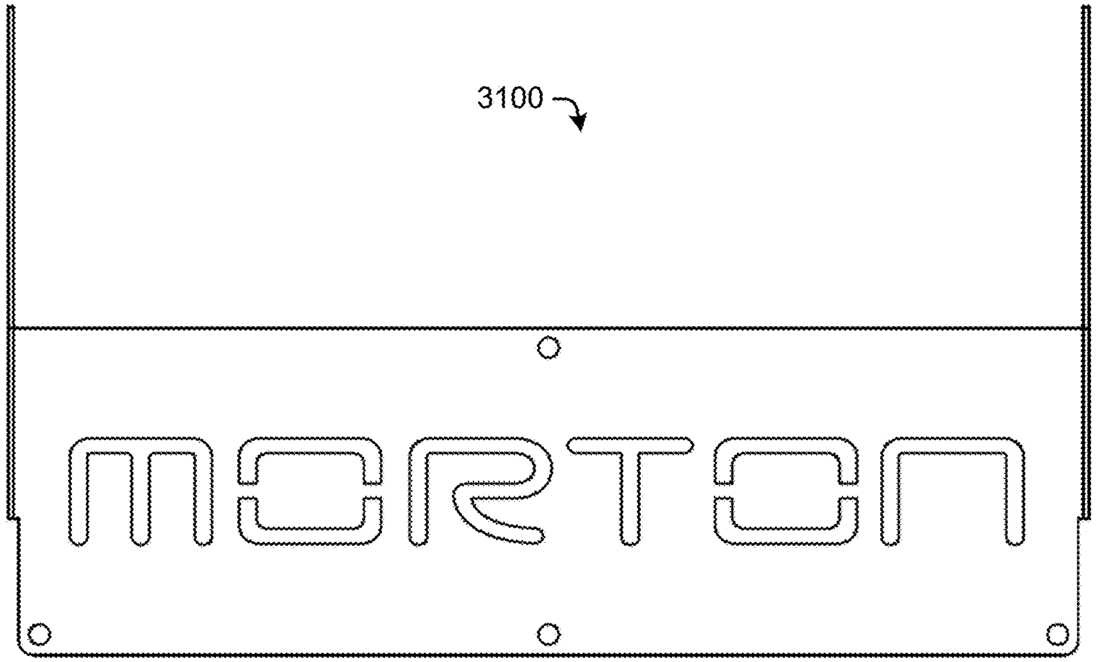
FIG. 31 illustrates a top view of an example part that may form at least a portion of the modular mounting system.

FIG. 31 illustrates a top view of an example front tray 3100 which may be substantially similar to the front tray 2400 but with a 20-inch length dimension. The front tray 3100 may have any or all of the features discussed above regarding the front tray 2400 with the 16-inch dimension (e.g., the substantially planar surface 2402, the one or more mounting holes 2404, the first mounting arm 2406, the front coupling hole 2408, the rear coupling hole 2410, the cable routing opening 2412, and/or the second mounting arm 2414). In some instances, a perspective view, a front view, a rear view, a left side view, and a right side view of the front tray 3100 may be substantially similar to those of the front tray 2400. The front tray 3100 may include one or more ornamental features such as a logo cut-out on the substantially planar surface 2402 or other surfaces of the front tray 3100.

Figure 32:
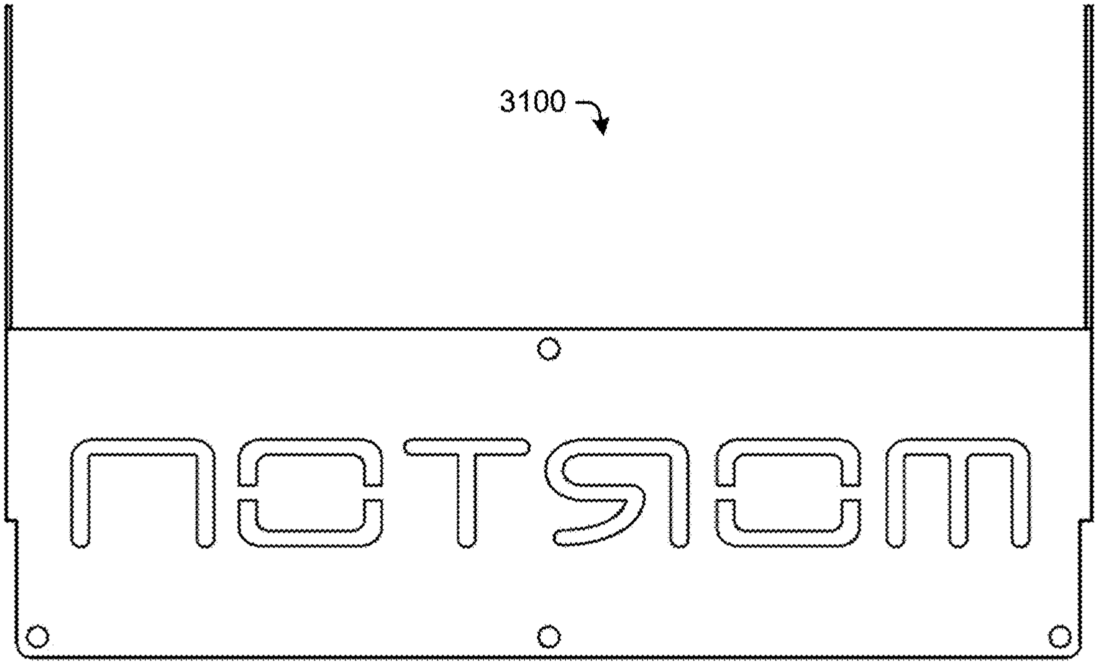
FIG. 32 illustrates a bottom view of an example part that may form at least a portion of the modular mounting system.

FIG. 32 illustrates a bottom view of the front tray 3100.

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A modular system for mounting equipment, the modular system including:
- a first part with:
  - one or more surfaces for adjacently coupling the first part to one or more additional parts, the one or more surfaces including:
    - a first coupling mechanism arranged at a first position on a first surface of the one or more surfaces for adjacently coupling the one or more additional parts at the first position adjacent to the first part;
    - a second coupling mechanism arranged at a second position on a second surface of the one or more surfaces for adjacently coupling the one or more additional parts at a second position adjacent to the first part; and
  - a top surface, for mounting the equipment, extendable from the first part to the one or more additional parts upon adjacently coupling the one or more additional parts to the first part.

2. The modular system of claim 1, wherein the first surface is a side surface of the first part and the first position is a side position.

3. The modular system of claim 2, wherein the second surface is a front surface or a rear surface, and the second position is a front position or a rear position.

4. The modular system of claim 1, wherein:
- the first coupling mechanism is a front coupling mechanism on a side surface;
- the second coupling mechanism is a rear coupling mechanism on the side surface;
- the first position is a front position adjacent to the side surface; and
- the second position is a rear position adjacent to the side surface.

5. The modular system of claim 1, wherein:
- the first coupling mechanism couples the one or more additional parts to the first part at a side surface of the first part; and
- the second coupling mechanism couples the one or more additional parts to the first part at a rear surface of the first part.

6. The modular system of claim 1, further comprising a second part of the one or more additional parts with:
- a side surface including a third coupling mechanism corresponding to the first coupling mechanism or the second coupling mechanism such that the second part is adjacently couplable to the first part next to the first part.

7. The modular system of claim 1, wherein:
- the first position aligns the first part side-by-side with the one or more additional parts; and
- the second position aligns the first part front to back with the one or more additional parts.

8. The modular system of claim 1, wherein the first coupling mechanism and the second coupling mechanism comprise one or more of a hole, a screw, or a bolt.

9. The modular system of claim 1, wherein the first part includes a cable routing opening on the first surface.

10. The modular system of claim 9, wherein the cable routing opening is arranged between a front coupling hole and a second coupling hole of a set of coupling holes.

11. The modular system of claim 9, wherein the cable routing opening is a first cable routing opening and the one or more additional parts includes a second cable routing opening to align with the first cable routing opening.

12. The modular system of claim 1, wherein the first part further includes a first cable routing opening on a first side surface of the one or more surfaces, a second cable routing opening on a second side surface, and a third cable routing opening on a rear surface.

13. A modular system for mounting equipment, the modular system including:

a first part with:

a first side surface including a first coupling mechanism to couple the first part to one or more additional parts; and a rear surface including a second coupling mechanism to couple the first part to one or more additional parts; and a second part with:

a second side surface or a front surface including a third coupling mechanism to align with the first coupling mechanism or the second coupling mechanism such that the second part is adjacently couplable to the first part at the first side surface and the rear surface.

14. The modular system of claim 13, wherein the first part has a second side surface, opposite the first side surface, including a fourth coupling mechanism to align with third coupling mechanism to couple the second part to the first part.

15. The modular system of claim 13, wherein the first part has a first interior space for routing cables of the equipment to a second interior space of the second part.

16. The modular system of claim 13, wherein the first part has a rectangular prism shape and the second part has a wedge shape.

17. A modular system for mounting equipment, the modular system including:

a first part with:

a first side surface including a first coupling mechanism for coupling the first part to one or more additional parts; and a first cable routing opening on the first side surface; and a second part with:

a second side surface including a second coupling mechanism to align with the first coupling mechanism to adjacently couple the second part to the first part; and a second cable routing opening on the second side surface for aligning with the first cable routing opening.

18. The modular system of claim 17, wherein the first cable routing opening is arranged between a first coupling hole of the first coupling mechanism and a second coupling hole of the first coupling mechanism.

19. The modular system of claim 17, wherein the first part includes a rear surface with a third cable routing opening and the second part includes a front surface with a fourth cable routing opening to align with the third cable routing opening.

20. The modular system of claim 19, wherein the first part has a rectangular prism shape with a first height dimension and the second part has the rectangular prism shape with a second height dimension that is greater than the first height dimension.

* * * * *